(12) United States Patent
K. N. et al.

(10) Patent No.: US 7,822,456 B2
(45) Date of Patent: Oct. 26, 2010

(54) LOCATING A MID-SAGITTAL PLANE

(75) Inventors: Bhanu Prakash K. N., Singapore (SG); Ihar Volkau, Singapore (SG); Wieslaw Lucjan Nowinski, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 696 days.

(21) Appl. No.: 10/586,376

(22) PCT Filed: Apr. 1, 2005

(86) PCT No.: PCT/SG2005/000106

§ 371 (c)(1),
(2), (4) Date: Jun. 1, 2007

(87) PCT Pub. No.: WO2005/096227

PCT Pub. Date: Oct. 13, 2005

(65) Prior Publication Data

US 2007/0276219 A1 Nov. 29, 2007

Related U.S. Application Data

(60) Provisional application No. 60/558,567, filed on Apr. 2, 2004.

(51) Int. Cl.
*A61B 5/05* (2006.01)
(52) U.S. Cl. .................. 600/407; 382/128; 600/410; 600/425
(58) Field of Classification Search .............. 600/407, 600/410, 425; 382/286, 287, 128
See application file for complete search history.

(56) References Cited

U.S. PATENT DOCUMENTS

2002/0130660 A1 * 9/2002 Thesen ................. 324/309

FOREIGN PATENT DOCUMENTS

| WO | WO 03/060827 | * | 7/2003 |
| WO | WO 03/060827 A1 | | 7/2003 |

(Continued)

OTHER PUBLICATIONS

S. Soman, A.C.S. Chung, W.E.L. Grimson, and W.M. Wells III. "Rigid Registration of Echoplanar and Conventional Magnetic Resonance Images by Minimizing the Kullback-Leibler Distance." Lecture Notes in Computer Science. vol. 2717/2003. 2003. pp. 181-190.*

(Continued)

*Primary Examiner*—Long V Le
*Assistant Examiner*—Nigel Fontenot
(74) *Attorney, Agent, or Firm*—Klarquist Sparkman, LLP (57) ABSTRACT

Volumes of interest may be defined, within a three-dimensional brain image, for each of three orthogonal directions. Measures, which may, for example, be energy or entropy measures, are determined for slices of the volumes of interest in the three directions. The volume of interest corresponding to the sagittal direction is then identified. The slice, among the slices in the volume of interest corresponding to the identified sagittal direction, having the optical measure is used to define a first estimate of the mid-sagittal plane. The first estimate of the mid-sagittal plane may then be used to build an input to an optimization technique, which operates until a convergence criterion is satisfied, at which point a final estimate of the mid-sagittal plane may be produced.

125

34 Claims, 9 Drawing Sheets

FOREIGN PATENT DOCUMENTS

WO    WO 2004/034178 A2    4/2004

OTHER PUBLICATIONS

Ardekani et al. ("Automatic Detection of the Mid-Sagittal Plane in 3D Brain Images"), 1997.*

Liu et al. ("Automatic Extraction of the Central Symmetry (Mid-Sagittal) Plane from Neuroradiology Images"), 1996.*

Prima et al. ("Computation of the Mid-Sagittal Plane in 3D Images of the Brain"), 2002.*

Liu et al. ("Robust Midsagittal Plane Extraction from Normal and Pathological 3-D Neuroradiology Images"), 2001.*

Liu, et al., "Automatic Extraction of the Central Symmetry (Mid-Sagittal) Plane from Neuroradiology Images", (1996), The Robotics Institute, Canegie Mellon University, Pittsburge, PA, USA, http://www.ri.cmu.edu/pubs/pub_432.html.

Liu, et al., "Robust Midsagittal Plane Extraction from Normal and Pathological 3-D Neuroradiology Images", IEEE Transactions on Medical Imaging, Mar. 2001, pp. 175-191, vol. 20, No. 3.

Prima, et al. "Computation of the Mid-Sagittal Plane in 3-D Brain Images", IEEE Transactions on Medical Imaging, Feb. 2002, pp. 122-138, vol. 21, No. 2.

* cited by examiner

LOCATING A MID-SAGITTAL PLANE

CROSS-REFERENCE TO RELATED APPLICATION

This application claims the benefit of U.S. provisional application No. 60/558,567, filed Apr. 2, 2004.

FIELD OF THE INVENTION

The present invention relates to methods for analyzing three-dimensional brain images described by brain volume data and, more particularly, to methods for determining a location for a mid-sagittal plane in a three-dimensional brain image.

BACKGROUND

To study an organ, such as a human brain, a three-dimensional image, or "volume scan," may be taken. An exemplary volume scan may be taken using Magnetic Resonance (MR) Imaging. The result of a volume scan may be considered to be volume data. For a review of the basics of MR Imaging, see Joseph P. Hornak, The Basics of MRI, 1997 (available at www.cis.ritedu/htbooks/mri), the contents of which are hereby incorporated herein by reference. In particular, see the section of Chapter 12 entitled Volume Imaging (3-D Imaging). For a standard database of MR volume data examples, see www.bic.mni.mcgill.ca/brainweb. The volume data may be considered to be organized in slices. Three types of slices are typically considered particularly useful, including axial slices taken normal to and along a vertical axis in an axial plane, which divides the brain into top and bottom portions. The slices also include coronal slices taken normal to and along a longitudinal axis in a coronal plane, which divides the brain into anterior and posterior portions. The slices further include sagittal slices taken normal to and along a transverse axis in a sagittal plane, which divides the brain into left and right portions. Typically, each slice is considered to be a two dimensional array of pixel intensity values. However, a quality other than intensity (e.g., hue, saturation, etc.) may be associated with a pixel. The analog of a pixel in three dimensions is called a voxel. A voxel may be considered to have a size in each of three directions.

In human brain anatomy, two cerebral hemispheres may be identified as well as an interhemispheric fissure, which is a longitudinal furrow in the midline between the two cerebral hemispheres. A plane, called the "mid-sagittal plane," may be defined as the sagittal plane passing through the interhemispheric fissure of the brain. The mid-sagittal plane typically contains less cerebral structure than a sagittal plane through any part of the rest of the brain in the vicinity of interhemispheric fissure.

When a volume scan of a given brain is taken, the position of the given brain within the co-ordinate system of the volume data depends on the position of the patient's head during the acquisition of the volume scan image. It is known that the volume data may be analyzed to determine a location for the mid-sagittal plane for the brain volume data. Determining the location for the mid-sagittal plane allows for the subsequent determination of a function to re-orient the mid-sagittal plane to a predetermined location. The re-orientation function, which may include translation and rotation, may then be applied to all of the brain volume data to orient the brain volume data in a preset co-ordinate system for further analysis.

Previously developed methods for determining the location for the mid-sagittal plane are based on the extraction of symmetry lines in axial or coronal slices of the volume data and use a priori information about slice direction. The basic classes of methods include a class of methods that are based on the interhemispheric fissure and a class of methods that are based on a symmetry criterion.

The basic hypotheses underlying the class of methods that are based on the interhemispheric fissure include a hypothesis that the interhemispheric fissure of the brain is roughly planar and a hypothesis that the interhemispheric fissure provides a good landmark for further volumetric symmetry analysis. In this class of methods generally, the fissure is identified as a segmented curve in MR images. Then, a three dimensional plane is found using an orthogonal regression from a set of control points representing the segmented curve.

The theory behind the methods based on a symmetry criterion is that the mid-sagittal plane maximizes the similarity between the brain image and its reflection, i.e., that the mid-sagittal plane is the sagittal plane with respect to which the brain exhibits maximum symmetry. Most of the methods based on symmetry share a common general scheme. First, an adequate parameterization is chosen to characterize any plane of the three-dimensional Euclidian space by a vector composed of a few coefficients. For each selected plane in a set of possible planes, an adapted similarity measure (symmetry criterion) is determined for the original three-dimensional brain image and a three-dimensional reflection image, where the reflection image is determined with respect to the selected plane. Then, the set of possible planes is searched to find the plane having the maximum adapted similarity measure. The chosen symmetry criterion is often the cross correlation between the intensities of voxels in the two three-dimensional images.

Unfortunately, known methods may include such drawbacks as a requirement for some a priori information, such as whether a given set of slices is oriented in an axial plane, a coronal plane or a sagittal plane. Additionally, the methods may be considered time consuming, orientation dependent and limited to small tilts in the data.

Clearly there exists a need for a method of determining the location of a mid-sagittal plane in a three-dimensional brain image that obviates a requirement for a priori information and overcomes other shortfalls of the previously developed methods.

SUMMARY

Initially, volumes of interest are defined within a three-dimensional brain image described by brain volume data. Measures (entropy or energy) are then determined for the slices in the volumes of interest associated with each of three directions. One of the three directions is identified as the sagittal direction and a slice of the volume associated with the sagittal direction and having the optimal measure may be used to define a first estimate of the mid-sagittal plane. The first estimate of the mid-sagittal plane may then be used in an optimization technique to find a final estimate of the mid-sagittal plane.

In accordance with an aspect of the present invention there is provided a method. The method includes determining a candidate sagittal direction for a brain image, the brain image defined by brain volume data in a three-dimensional space associated with first, second and third directions, the first, second and third directions being orthogonal to each other, the candidate sagittal direction being the closest direction of the first, second and third directions to an actual sagittal direction. The determining the candidate sagittal direction includes defining a first three-dimensional volume of interest of the brain image, obtaining brain volume data in the first volume of interest for a first plurality of slices in the first direction, defining a second three-dimensional volume of interest of the brain image, obtaining brain volume data in the second volume of interest for a second plurality of slices in the second direction, defining a third three-dimensional volume of interest of the brain image, obtaining brain volume data in the third volume of interest for a third plurality of slices in the third direction, determining a measure for each slice of the first, second and third plurality of slices, for each of the first, second and third plurality of slices, plotting the measure for each slice of the plurality of slices, sequentially along a plot axis corresponding to respective first, second and third directions, to produce first, second and third measure plots and determining, from the first, second and third measure plots, which of the first, second and third directions is the candidate sagittal direction with a candidate plurality of slices associated therewith.

In accordance with another aspect of the present invention there is provided a method of determining an approximate location for a mid-sagittal slice from a plurality of slices of brain volume data. The method includes obtaining the brain volume data for the plurality of slices, where the plurality of slices is generally oriented parallel to a sagittal plane and the plurality of slices is positioned along an axis that is normal to the sagittal plane, determining a measure for each slice of the plurality of slices, wherein each measure is determined based on the brain volume data contained in each slice and selecting a candidate mid-sagittal slice among the plurality of slices, based on identifying an optimal measure amongst the measures determined for each slice of the plurality of slices.

In accordance with a further aspect of the present invention there is provided a method. The method includes determining a candidate sagittal direction for a brain image, the brain image defined by brain volume data in a three-dimensional space associated with first, second and third directions, the first second and third directions being orthogonal to each other, the candidate sagittal direction being the closest direction of the first, second and third directions to an actual sagittal direction. The determining of the candidate sagittal direction includes obtaining brain volume data for a first plurality of slices in the first direction, obtaining brain volume data for a second plurality of slices in the second direction, obtaining brain volume data in for a third plurality of slices in the third direction, determining a measure for each slice of the first second and third plurality of slices, for each of the first, second and third plurality of slices, plotting the measure for each slice of the plurality of slices, sequentially along an axis corresponding to respective first, second and third directions to produce first, second and third measure plots and determining, from the first, second and third measure plots, which of the first, second and third directions is the candidate sagittal direction with a candidate plurality of slices associated therewith.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

In overview, volumes of interest are defined within a three-dimensional brain image by slices of brain volume data associated with three orthogonal directions. A measure, which may, for instance, be an energy or an entropy measure, is determined for each of the slices. The one direction, among the three directions associated with the volumes of interest, that most closely corresponds to the sagittal direction is then identified. The slice, among the slices in the volume of interest associated with the identified sagittal direction, having the optimal measure is used to define a first estimate of the mid-sagittal plane. The first estimate of the mid-sagittal plane may then be used as input to an optimization technique, which operates until a convergence criterion is satisfied, at which point a final estimate of the mid-sagittal plane may be produced.

Figure 1:
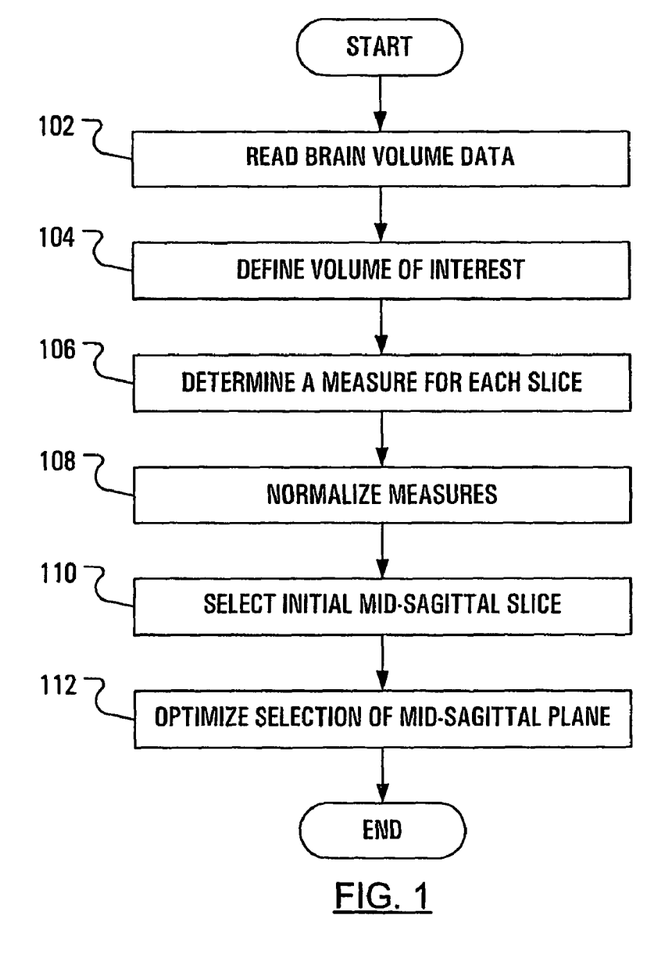
FIG. 1 illustrates steps in a mid-sagittal plane-determining method according to an embodiment of the present invention.

FIG. 1 illustrates steps in an exemplary mid-sagittal plane-determining method. Initially, brain volume data is read into a processor (step 102). The brain volume data may be MR data or any other image data. Notably, MR data is typically provided in slices oriented in three orthogonal planes or axes, which may, for example, be labeled X, Y and Z. However, for the purposes of the methods described herein, if the image data is not provided in slices, then the image data may be processed to rearrange the image data into slices. As should be clear to a person of ordinary skill in the art, three dimensional volume data contains a set of two-dimensional slices normal to and along each of three orthogonal directions (X, Y, Z). This is a basic principle of tomographic imaging, use of which allows one to obtain a two dimensional slice of an object described by three dimensional data. Each slice normal to a given axis may be associated with a coordinate in the given axis. For example, a slice normal to the X direction may be associated with x=5, since, for each pixel in the slice, x=5.

Notably, the brain volume data can be either isotropic or anisotropic. That is, each voxel in the brain volume data may have a uniform size along all three orthogonal axes or may exhibit different sizes along the three orthogonal axes.

The number of slices normal to the X direction may be labeled $X_{max}$, the number of slices normal to the Y direction may be labeled $Y_{max}$, and the number of slices normal to the Z direction may be labeled $Z_{max}$. Notably, there may be a different number of slices normal to each direction. Note that typically brain volume data is provided as an even number of slices in each direction.

The processor may then define a volume of interest associated with each direction (step 104). The volume of interest associated with a given direction is preferably centered about a mid slice of the slices normal to the given direction. An assumption is made in such a preference that the mid-sagittal plane will pass through the vicinity of the centre of the image of the brain defined by the brain volume data and therefore will pass through all three volumes of interest. This assumption is expected to be true if the brain scan is of the whole of the brain.

The three volumes of interest may be defined by first defining an index for the mid slices normal to the X, Y and Z directions as mid_x, mid_y and mid_z, respectively. The index defined for mid_x may, for instance, be x=$X_{max}$/2. The index defined for mid_y may, for instance, be y=$Y_{max}$/2. The index defined for mid_z may, for instance, be z=$Z_{max}$/2. An index for an initial slice and a final slice normal to a given direction may then be determined based on the index for the mid slice normal to the given direction and a difference value:
Init_x=mid_x−20 mm; Final_x=mid_x+20 mm;
Init_y=mid_y−20 mm; Final_y=mid_y+20 mm;
Init_z=mid_z−20 mm; and Final_z=mid_z+20 mm. The difference value may be considered to be converted into a number of slices, given the dimension of the voxels normal to the direction of interest.

The three volumes of interest can then be defined using the initial slice and the final slice. The three volumes of interest associated with the three directions include: a volume of interest associated with the X direction ($VOI_x$), whose candidate slices include only the slices normal to the X direction associated with the x-coordinates ranging from Init_x to Final_x; a volume of interest associated with the Y direction ($VOI_y$), whose candidate slices include only the slices normal to the Y direction associated with the y-coordinates ranging from Init_y to Final_y; and a volume of interest associated with the Z direction ($VOI_z$), whose candidate slices include only the slices normal to the Z direction associated with the z-coordinates ranging from Init_z to Final_z.

As will be apparent to a person of ordinary skill in the art, the volumes of interest may be defined external to the processor and the processor may simply receive the volumes of interest as input.

It should be noted that a difference value of 40 mm (20 mm on either side of the mid slice) has been chosen empirically. The Applicants have taken into account the following. According to Duvernoy, H. M., The Human Brain: Surface, Blood Supply, and Three Dimensional Sectional Anatomy, second edition, Springer, Vienna, 1999, p. 302, the sagittal slice 20 mm apart from the medial sagittal slice has large manifestation of white matter, it cross-sects the atrium and the occipital horn of the lateral ventricle and, additionally, has cerebrospinal fluid (CSF) in the meningeal space. The medial sagittal slice of brain may be shown (see Duvernoy, H. M, The Human Brain: Surface, Blood Supply, and Three Dimensional Sectional Anatomy, second edition, Springer, Vienna, 1999, p 323) to contain a smaller amount of white matter structures and a larger manifestation of CSF (in the interhemispheric fissure). These differences in the manifestation of white matter and CSF around the interhemispheric fissure allow the location of the initial mid-sagittal slice. However, it should be recognized that the 40 mm difference value is provided as an example only and it should be clear that another suitable volume range may be chosen.

For each volume of interest, a measure (for example, entropy or energy) may be determined (step 106, FIG. 1) for each candidate slice. For a given candidate slice normal to the X direction, a first exemplary energy measure, $I_1$, may be determined from:

$$I_1 = -\sum_{j,k} x_{jk},$$

where $x_{jk}$ is the intensity value of a pixel at the location (j, k) within the given candidate slice, where j represents the row index of the pixel and k represents the column index of the pixel.

A second exemplary energy measure, $I_2$, may be determined from:

$$I_2 = -\sum_{j,k} x_{jk} \log(x_{jk}).$$

A third exemplary energy measure, $I_3$, may be determined from:

$$I_3 = -\sum_{j,k} x_{jk}^2.$$

A fourth exemplary energy measure, $I_4$, may be determined from:

$$I_4 = -\sum_{j,k} x_{jk}^2 \log x_{jk}^2.$$

A fifth exemplary energy measure, $I_5$, may be determined from:

$$I_5 = -\sum_{j,k} x_{jk}^3.$$

Linear combinations of the above energy measures may also be used. Although the above energy measures relate to candidate slices normal to the X direction, it should be clear that corresponding structure may be used for determining energy measures for candidate slices normal to the Y direction and the Z direction. These energy measures produce a single value for each candidate slice in the volume of interest.

Where i is an intensity value of a pixel in a given candidate slice, which pixel may have an intensity value selected from an intensity range from 0 to 255 inclusive, and $p_i$ is the probability that a pixel randomly selected from among the pixels in the given candidate slice has the intensity value i, a first exemplary entropy measure, $I_1(p_i)$, may be determined from:

$$I_1(p_i) = \sum_{i=0}^{255} p_i \log(p_i)$$

which may be considered a measure of uncertainty of $p_i$. This measure is the negation of the well known "Shannon's entropy" measure.

Where $p_{i0}$ is the probability that a pixel randomly selected from among the pixels in a reference slice has the intensity value i, a second exemplary entropy measure, $I_2(p_i, p_{i0})$, may be determined from:

$$I_2(p_i, p_{i0}) = \sum_{0}^{255} p_i \log(p_i/p_{i0})$$

which may be considered a measure of the relative entropy of the distribution $p_{i0}$ with respect to the distribution of $p_{i0}$, and is known as the "Kullback-Leibler distance" between $p_i$ and $p_{i0}$.

The above entropy measures are determined by summing over a range of intensity values. In the equations given, there are 256 intensity values. The reference slice normal to each direction may be the corresponding initial slice. Like the energy measures, these entropy measures produce a single value for each slice.

Figure 2:
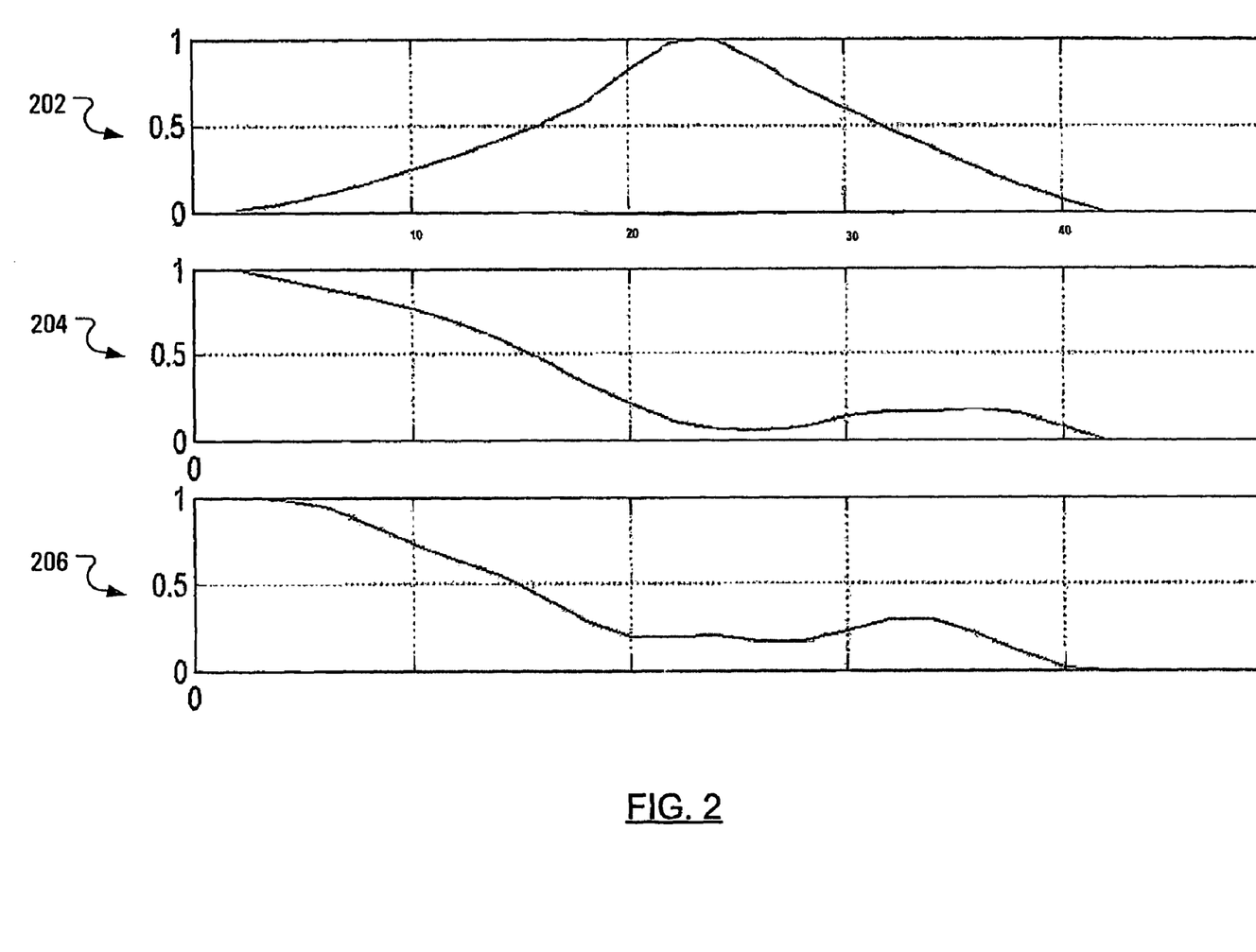
FIG. 2 illustrates three plots, each plot showing a normalized energy measure in each slice of a set of slices in a volume of interest associated with one of three directions.

Once measures, such as energy or entropy, have been determined for each volume of interest, the values of the measures may be normalized to take a value in the range from zero to one (step 108, FIG. 1). FIG. 2 illustrates a normalized plot of measures for slices in each volume of interest as having a horizontal plot axis and a vertical magnitude axis. In particular, FIG. 2 illustrates a normalized plot of measures for slices normal to the X direction 202 (i.e., for $VOI_x$, the x-axis is the plot axis), a normalized plot of measures for candidate slices normal to the Y direction 204 (i.e., for $VOI_y$, the y-axis is the plot axis) and a normalized plot of measures for candidate slices in the Z direction 206 (i.e., for $VOI_z$, the z-axis is the plot axis). The only normalized plot of measures to have a bell-shaped curve may be identified as having a plot axis corresponding to the sagittal direction. In particular, a processor may, for instance, ascertain the bell shape by recognizing that values of the measure monotonically increase until a point or a set of points and then monotonically decrease. In the exemplary plots of FIG. 2, the normalized plot of measures for candidate slices normal to the X direction 202, has a bell-shaped curve and, as such, the x-axis may be identified as most closely corresponding to the sagittal direction. Notably, as defined herein, the sagittal direction is normal to each sagittal plane.

Alternatively, a greatest degree of symmetry may be recognized in the normalized plot of measures for candidate slices normal to the X direction 202 when compared to the normalized plot of measures for candidate slices normal to the Y direction 204 and the normalized plot of measures for candidate slices in the Z direction 206. That is, an axis orthogonal to the plot axis may be found, in the normalized plot of measures for candidate slices normal to the X direction 202, about which the plot exhibits a greater degree of symmetry than either of the other two plots exhibit about any axis orthogonal to their respective plot axes. As such, the X direction may be identified as corresponding to the sagittal direction.

The peak of the normalized plot of measures having a plot axis identified as corresponding to the sagittal direction may be considered to be an optimal measure and to correspond to a candidate slice close to the mid-sagittal plane. In this way, a coarse estimate of the location of the mid-sagittal plane can be made from the three plots.

In other embodiments the energy or entropy values are not normalized before being plotted. If a normalization function is used to normalize the plots, it should be clear that the normalization function should be an increasing function to preserve the maximum in the data so that an optimal measure can be determined. (An increasing function is one in which the bigger the value of the argument the bigger the value of that function.)

Figure 3:
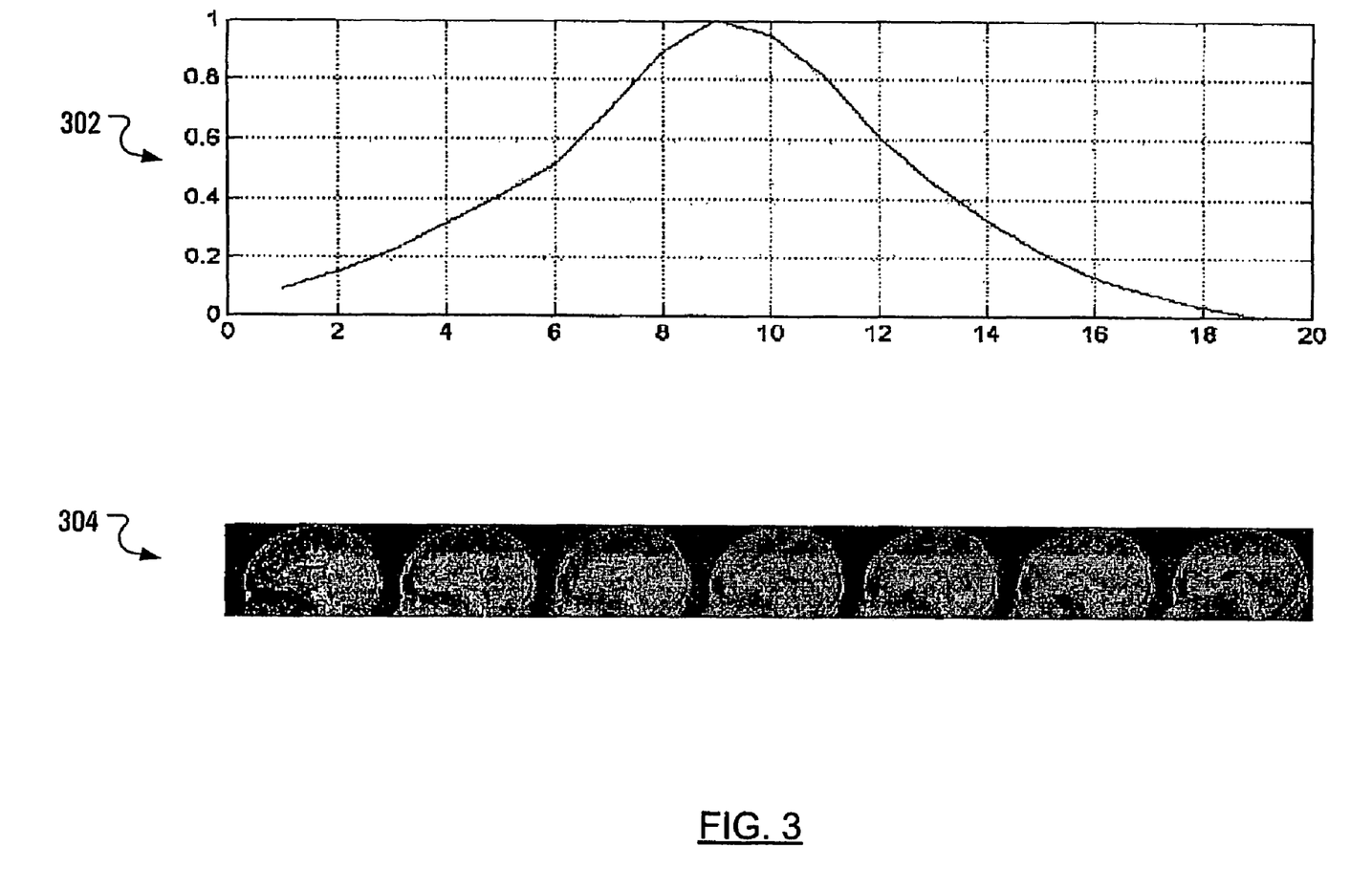
FIG. 3 illustrates a normalized plot of measures for exemplary slices in a volume of interest associated with the sagittal direction along with images of seven of the slices.

FIG. 3 illustrates another bell-shaped normalized plot of measures 302. (Notably, the normalized plot of measures 302 is distinct from the normalized plot of measures 202 of FIG. 2) The normalized plot of measures 302 is defined over 20 exemplary candidate slices normal to the sagittal direction along with images derived from seven of the 20 candidate slices. The middle seven of the 20 exemplary candidate slices are illustrated, as indicated by reference numeral 304, to illustrate changes in brain anatomy around the peak of the plot of measures 302. The candidate slice at which the peak of the bell-shaped normalized plot of measures 302 occurs may be selected as an initial mid-sagittal slice (step 110, FIG. 1). The initial mid-sagittal slice may be used to define a first estimate of a location for the mid-sagittal plane. The coordinate value of the initial mid-sagittal slice, in the sagittal direction, may be labeled N for convenience.

Figure 4A:
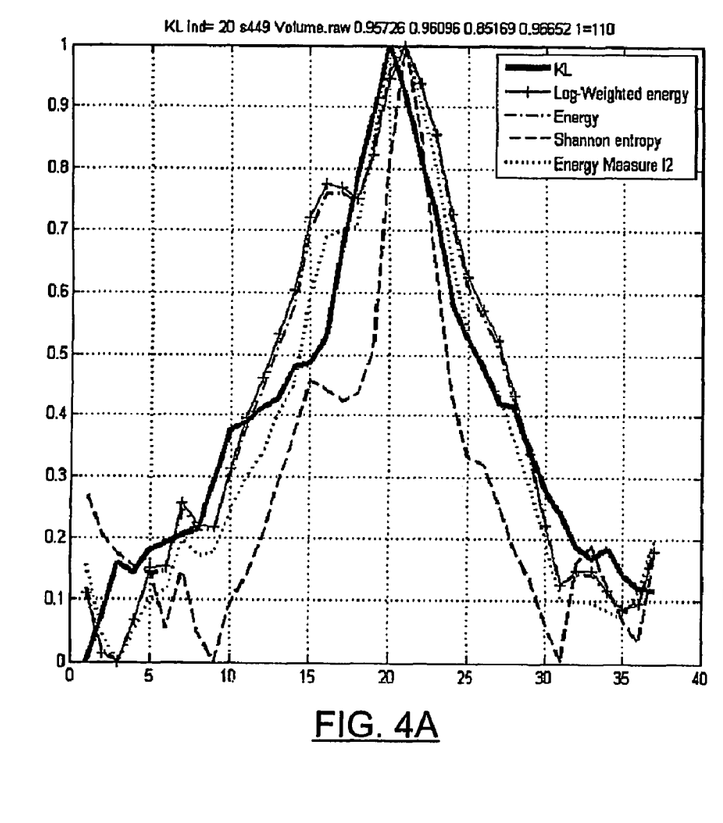
FIG. 4A illustrates plots of various measures for sagittal slices of a brain volume scan.

FIG. 4A illustrates plots of three energy measures and two entropy measures for 37 candidate slices of a first brain volume scan normal to a known sagittal direction. As can be seen from the plots, three of the measures produce a peak (or optimal measure) in the corresponding plot at candidate slice 21, with the remaining two measures producing peaks at candidate slices 19 and 20 (i.e., N=21).

Figure 4B:
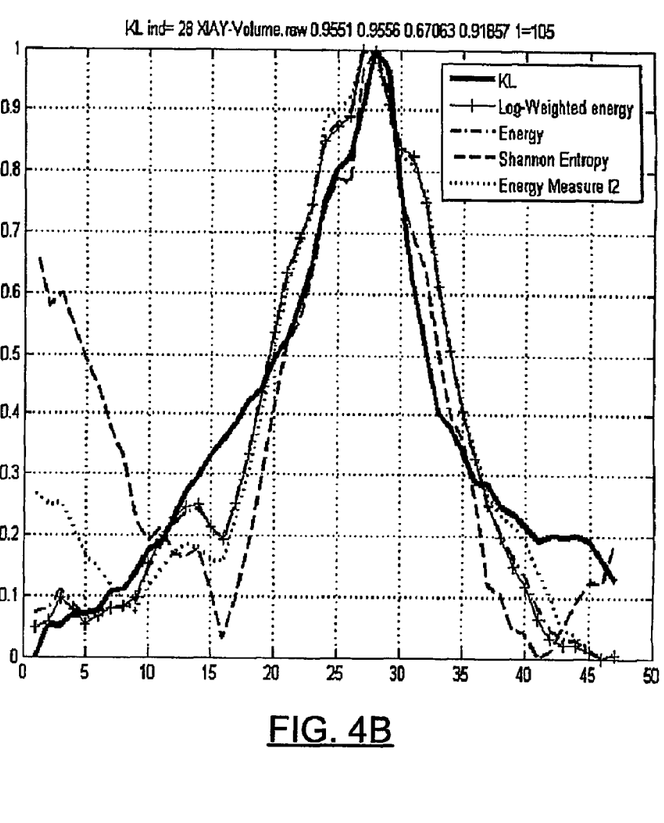
FIG. 4B illustrates plots of various measures for sagittal slices of a brain volume scan.

FIG. 4B illustrates plots of three energy measures and two entropy measures for 47 candidate slices of a second brain volume scan (distinct from the first brain volume scan of FIG. 4A) normal to a known sagittal direction. As can be seen from the plots, four of the measures produce a peak in the corresponding plot at candidate slice 27, with the remaining measure producing a peak at candidate slice 28 (i.e., N=27).

Each optimal measure may, therefore, be considered to lead to the selection of an initial mid-sagittal slice, coordinates of pixels in which may provide a good starting simplex for the optimization technique used to determine a location for a final mid-sagittal plane.

In FIGS. 4A and 4B, a solid line represents Kullback-Leibler entropy measure, $I_2(p_i, p_{i0})$, a solid line connecting plus signs represents the fourth exemplary (log weighted) energy measure, $I_4$, an alternating dot-dash line represents the third exemplary energy measure, $I_3$, a dashed line represents Shannon entropy measure, $I_1(p_i)$, and a dotted line represents a sixth exemplary energy measure $$I_6 = \sum_{j,k} x_{jk}^2 - \left(\sum_{j,k} x_{jk}\right)^2.$$

The Applicants have achieved better results with the Kullback-Leibler entropy measure, $I_2(p_i, p_{i0})$. However, it should be noted that the first exemplary energy measure, $I_1$, is the least computationally intensive measure among the measures proposed herein.

It may be considered, for convenience, that the candidate slice selected as the initial mid-sagittal slice is normal to the X direction. The initial mid-sagittal slice may be considered to have four vertices, $P_1, P_2, P_3, P_4$, which may be represented as:

$P_1(x, y, z) = (N, 1, 1);$ $P_2(x, y, z) = (N, 1, Z_{max});$ $P_3(x, y, z) = (N, Y_{max}, 1);$ and $P_4(x, y, z) = (N, Y_{max}, Z_{max}).$ The initial mid-sagittal plane defined by the four vertices ($P_1, P_2, P_3, P_4$) of the initial mid-sagittal slice may be used for building a starting simplex for an optimization process (step 112, FIG. 1). The coordinates of the four vertices that define the initial mid-sagittal plane may be used as input for the optimization process. The optimization problem to be solved by the optimization process may be formed as an unconstrained optimization problem. Techniques that can be used to solve this type of optimization problem include the known grid-free algorithm of Nelder-Mead technique, the exhaustive search technique and the unconstrained optimization techniques available in Matlab™, a product marketed by The MathWorks of Natick, Mass.

As mentioned, an exemplary technique for solving an optimization problem that may be used to obtain a better estimate of a location for the mid-sagittal plane in a volume scan of a brain from the initial mid-sagittal plane is the Nelder-Mead optimization technique. The Nelder-Mead optimization technique is commonly used in non-linear regression problems and is known to operate under a number of rules, which may be expressed as steps.

The Nelder-Mead optimization acts upon a simplex, which is a shape with m+1 vertices, where m is the number of parameters in the optimization problem. Thus, when the Nelder-Mead optimization is used to solve a two parameter optimization problem, the simplex has three vertices, i.e., the simplex is a triangle. The determining of a location for the mid-sagittal plane in a three-dimensional brain image may be considered to be a three parameter optimization problem (m=3). As such, the simplex for the Nelder-Mead optimization has four (m+1) vertices. The initial mid-sagittal plane has four vertices, $P_1, P_2, P_3, P_4$, as defined above, and may be used for building a starting simplex for a Nelder-Mead optimization.

Three of the four vertices of the initial mid-sagittal plane may be processed to determine a first vertex, $S_0$, in a three-dimensional parametric space. A plane in a three-dimensional parametric space is defined by three three-dimensional points. We may consider the initial mid-sagittal plane to be defined by vertices $P_1, P_2$ and $P_3$, $P_i = (x_i, y_i, z_i)$. Vertex $P_1$ has a y coordinate in common with vertex $P_2$ and a z coordinate in common with vertex $P_3$. As such, the first vertex, $S_0$, in the three-dimensional parametric space may be defined by the set of three x coordinates for three vertices $P_1, P_2, P_3$, that is, $S_0 = \{x_1, x_2, x_3\}$. Additionally, three more vertices in the three-dimensional parametric space may be defined by deviating from $S_0$ in each of the coordinates, that is:

$S_1 = \{x_1 + \Delta, x_2, x_3\};$ $S_2 = \{x_1, x_2 + \Delta, x_3\};$ and $S_3 = \{x_1, x_2, x_3 + \Delta\}.$ From our exemplary vertices above, the four vertices in the three-dimensional parametric space are:

$S_0 = \{N, N, N\};$ $S_1 = \{N + \Delta, N, N\};$ $S_2 = \{N, N + \Delta, N\};$ and $S_3 = \{N, N, N + \Delta\}.$ To execute the Nelder-Mead optimization, a value for an objective function may be determined at each vertex of the simplex. The objective function may be, for instance, based on an original function such used to determine which slice of the volume of interest should be selected as the initial mid-sagittal plane. However, while the Nelder-Mead optimization is designed to find a minimum, the original function used to select the initial mid-sagittal plane is a maximum for the slice closest to the mid-sagittal plane. As such, the objective function may be formed by negating the original function so that a point in the parametric space associated with the minimum value of the objective function is actually associated with the maximum value of the original function.

For instance, where the original function is $I_1$, the objective function may be $-I_1$, and determining the objective function for $S_1$ requires determining the sum of the intensities of the pixels at vertices:

$P_1(x_1+\Delta, y, z) = (N+\Delta, 1, 1);$ $P_2(x_2, y, z) = (N, 1, Z_{max});$ and $P_3(x_3, y, z) = (N, Y_{max}, 1).$ The Nelder-Mead optimization steps include:
1) Reflect the vertex with the maximum value of the objective function through the centroid (center) of the simplex to locate a new vertex;
2) If the value of the objective function at the new vertex is the minimum value among the values of the objective function at the other three vertices, expand the simplex and reflect further;
3) If the value of the objective function at the new vertex is merely good, start at the top and reflect again; and
4) If the value of the objective function at the new vertex is the maximum value among the values of the objective function at the other three vertices, compress the simplex and reflect closer.

In the case of a three-dimensional parametric space, the simplex is a tetrahedron. The centroid may be found by averaging each of the coordinates of the three vertices that are not the vertex with the maximum value.

The steps are repeated until a predetermined convergence criterion is satisfied, at which time a final mid-sagittal plane may be considered to have been defined. In particular, the best vertex in the three-dimensional parametric space defines three vertices in the three-dimensional brain volume scan space. Using these vertices, a plane equation ($Ax+By+Cz+D=0$) may be formulated. Using this plane equation, an image of the optimal mid-sagittal plane may be constructed from the volume data. The image of the optimal mid-sagittal plane may then be output.

An exemplary convergence criterion can be defined as $$\sigma^2 = \sum_{n=0}^{m} \frac{(f_n - \bar{f})^2}{m},$$

where $$\bar{f} = \frac{\sum_{n}^{m} f_n}{m}$$

is the mean of the objective functions and $f_n$ is the value of the objective function at the $n^{th}$ vertex, $S_n$. The Nelder-Mead optimization may be considered to have converged when $\sigma < \epsilon$, where $\epsilon$ is a predefined small number.

The Nelder-Mead optimization may include rotation and translation to find the maximum value of the objective function. Notably, if the brain volume data is not rotated or translated relative to a pre-determined frame of reference as provided, the translations and rotations associated with the optimizing step may not be required. However, such a case is expected to be rare.

Figure 5A:
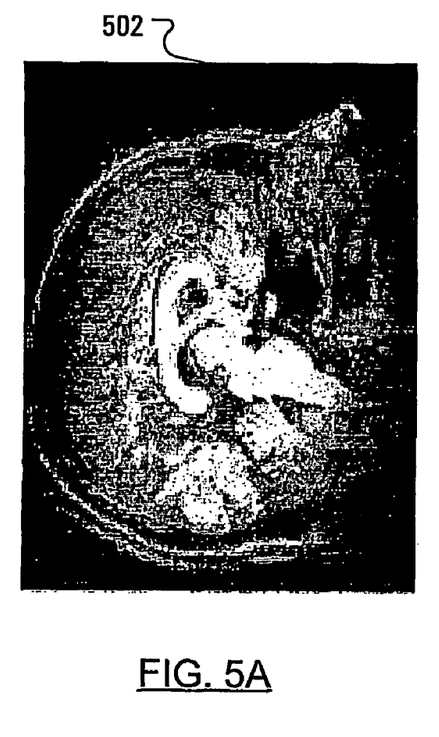
FIG. 5A illustrates an initial mid-sagittal slice.
Figure 5B:
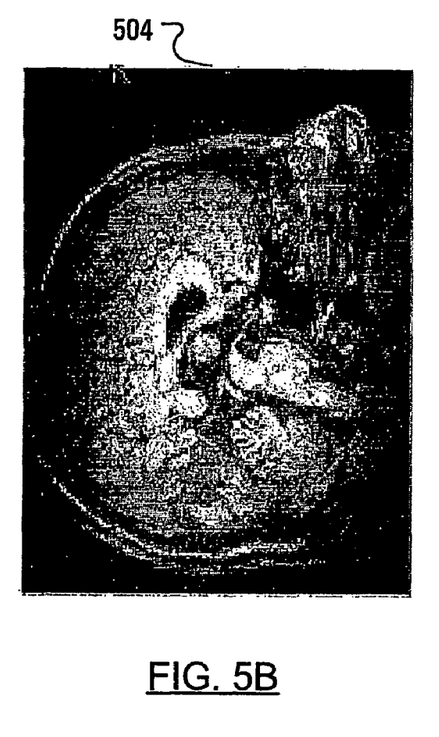
FIG. 5B illustrates a first final mid-sagittal slice based on a final mid-sagittal plane obtained using an entropy (Kullback-Leibler) measure and Nelder-Mead optimization using an initial mid-sagittal plane defined based on the initial slice of FIG. 5A for building a starting simplex according to an embodiment of the present invention.
Figure 5C:
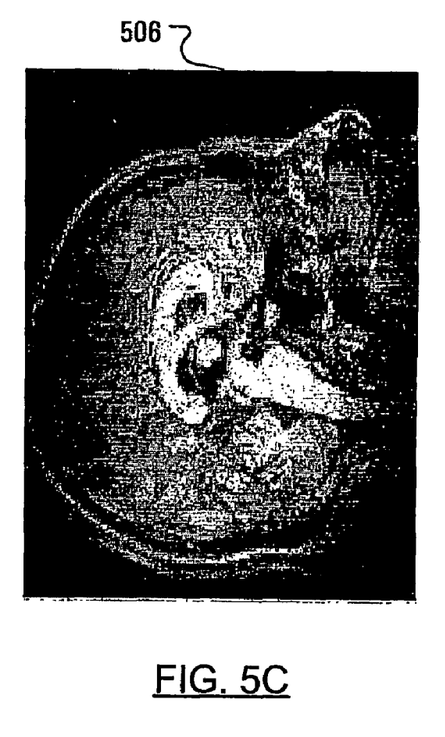
FIG. 5C illustrates a second final mid-sagittal slice based on a final mid-sagittal plane obtained using an energy measure and Nelder-Mead optimization using an initial mid-sagittal plane defined based on the initial slice of FIG. 5A for building a starting simplex according to an embodiment of the present invention.

FIG. 5A illustrates an initial mid-sagittal slice 502. FIG. 5B illustrates a first final mid-sagittal slice 504 based on a final mid-sagittal plane obtained using the Kullback-Leibler measure and Nelder-Mead optimization using an initial mid-sagittal plane defined based on the initial slice 502 of FIG. 5A for building a starting simplex. FIG. 5C illustrates a second final mid-sagittal slice 506 based on a final mid-sagittal plane obtained using an energy measure and Nelder-Mead optimization using an initial mid-sagittal plane defined based on the initial slice 502 of FIG. 5A for building a starting simplex.

Figure 6A:
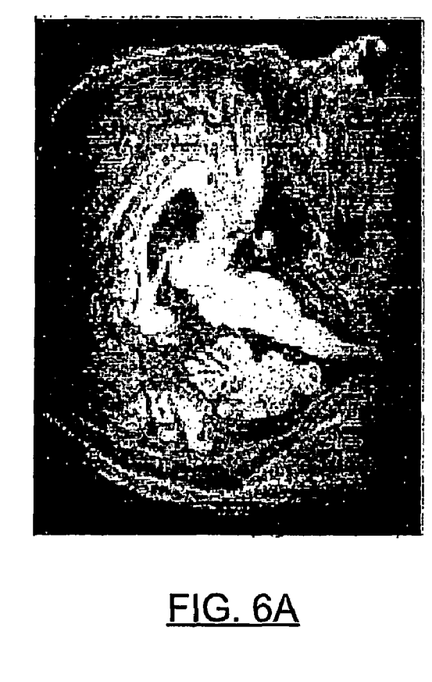
FIG. 6A illustrates an initial mid-sagittal slice.
Figure 6B:
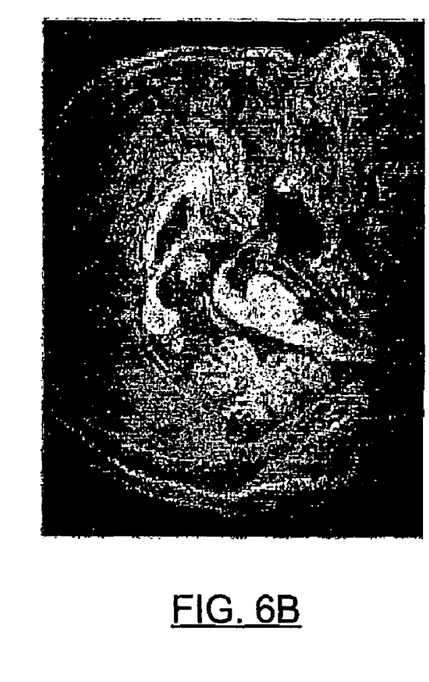
FIG. 6B illustrates a first final mid-sagittal slice based on a final mid-sagittal plane obtained using an entropy (Kullback-Leibler) measure and Nelder-Mead optimization using an initial mid-sagittal place defined based on the initial slice of FIG. 6A for building a starting simplex according to an embodiment of the present invention.
Figure 6C:
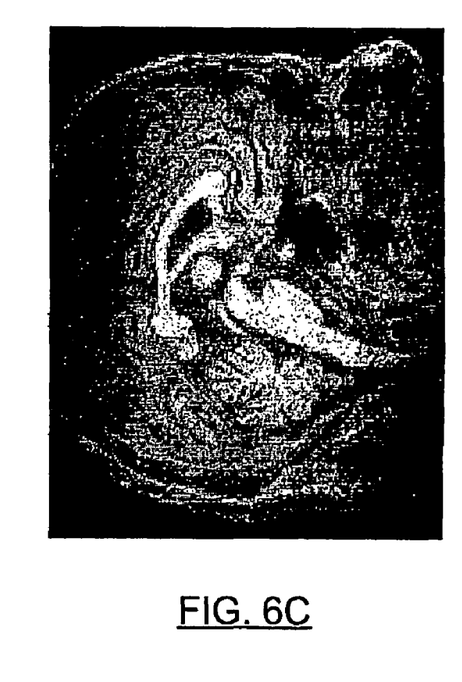
FIG. 6C illustrates a second final mid-sagittal slice based on a final mid-sagittal plane obtained using an energy measure and Nelder-Mead optimization using an initial mid-sagittal plane defined based on the initial slice of FIG. 6A for building a starting simplex according to an embodiment of the present invention.

FIG. 6A illustrates an initial mid-sagittal slice 602. FIG. 6B illustrates a first final mid-sagittal slice 604 based on a final mid-sagittal plane obtained using the Kullback-Leibler measure and Nelder-Mead optimization using an initial mid-sagittal place defined based on the initial slice 602 of FIG. 6A for building a starting simplex. FIG. 6C illustrates a second final mid-sagittal slice 606 based on a final mid-sagittal plane obtained using an energy measure and Nelder-Mead optimization using an initial mid-sagittal plane defined based on the initial slice 602 of FIG. 6A for building a starting simplex.

Once the location for the final mid-sagittal plane has been determined, a function may be determined to reorient the final mid-sagittal plane to a predetermined location. The re-orientation function, which may include translation and rotation, may then be applied to all of the brain volume data using known techniques, such as the known Affine Transformation, to orient the brain volume data in a preset co-ordinate system for further analysis.

Figure 7A:
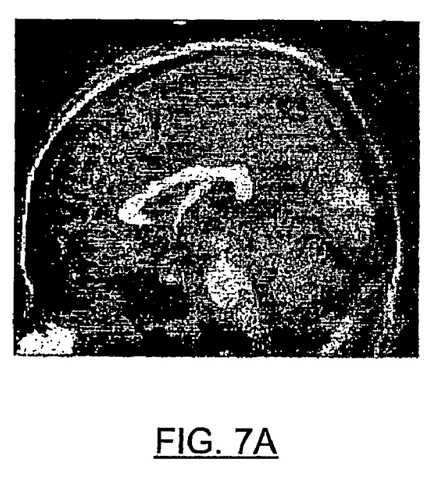
FIG. 7A illustrates a sagittal slice that is affected by statistical noise.
Figure 7B:
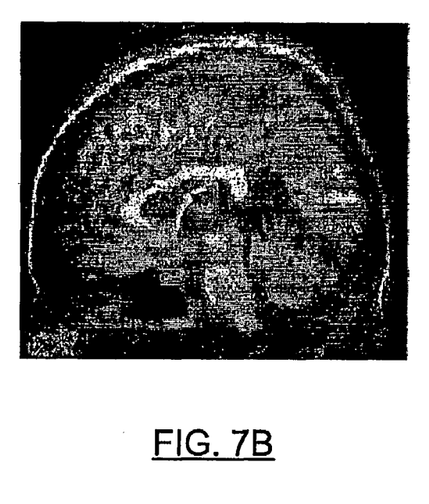
FIG. 7B illustrates a sagittal slice that is affected by radio frequency inhomogeneity noise.
Figure 7C:
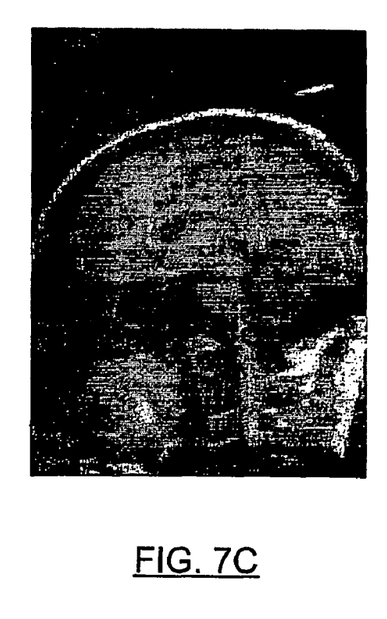
FIG. 7C illustrates a sagittal slice that is affected by partial volume averaging noise.

The procedure of obtaining Magnetic Resonance Imaging (MRI) brain volume scan is known to be inherently marred by various types of noise. One type of noise is a statistical noise, which is random and of high frequency. Statistical noise increases as the signal strength increases or as the acquisition time is decreased. Another source of statistical noise is the electronics of the MRI system and can be attributed to thermal effects. A sagittal slice 702 that is affected by statistical noise is illustrated in FIG. 7A. Another type of noise, radio frequency (RF) inhomogeneity noise, may be attributed to the physical structure of the coils of the MRI system: RF inhomogeneity noise may be seen to occur due to many physical factors affecting the magnetization field generated by the MRI system. A sagittal slice 704 that is affected by RF inhomogeneity noise is illustrated in FIG. 7B. Partial volume averaging noise becomes more dominant as slice thickness increases. A sagittal slice 706 that is affected by partial volume averaging noise is illustrated in FIG. 7C.

Advantageously, aspects of the methods of determining a location for a mid-sagittal plane in a three-dimensional brain image described above may be considered to function satisfactorily despite the presence of such noise as statistical noise, RF inhomogeneity noise and partial volume averaging noise.

Figure 8A:
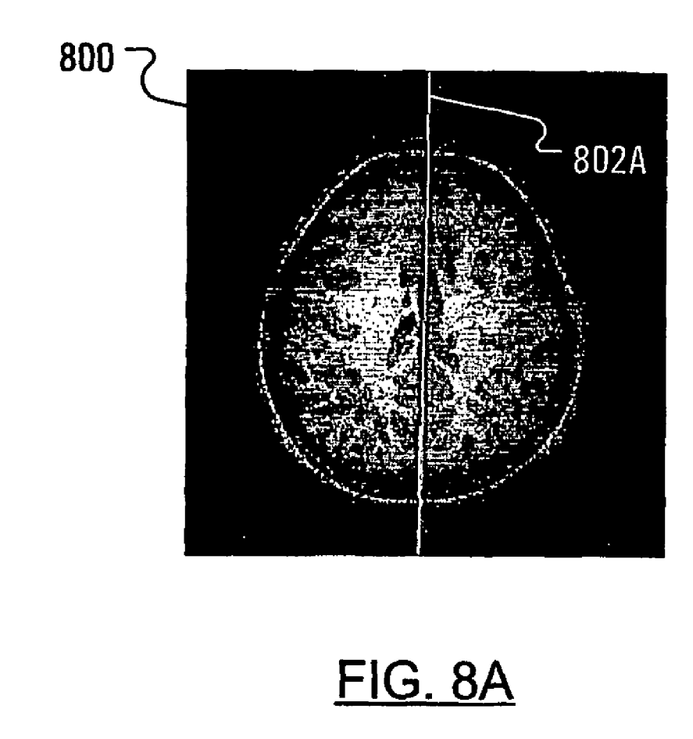
FIG. 8A illustrates a linear representation of a mid-sagittal plane on an axial slice of brain volume data, where the mid-sagittal plane has been obtained using an energy measure according to an embodiment of the present invention.
Figure 8B:
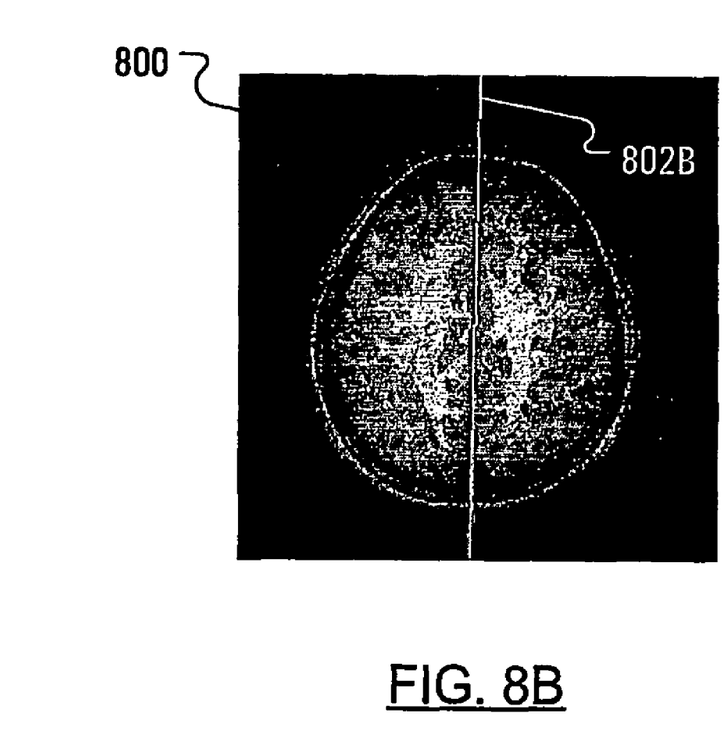
FIG. 8B illustrates a linear representation of a mid-sagittal plane on an axial slice of brain volume data, where the mid-sagittal plane has been obtained using an entropy (Kullback-Leibler) measure according to an embodiment of the present invention.

FIG. 8A illustrates a linear representation 802A of an optimized (final) mid-sagittal plane on an axial slice of brain volume data 800, where the mid-sagittal plane has been obtained using the first exemplary energy measure, $I_1$, outlined above. FIG. 8B illustrates a linear representation 802B of an optimized (final) mid-sagittal plane on the axial slice 800 of FIG. 8A, where the mid-sagittal plane has been obtained using the Kullback-Leibler entropy measure, $I_2(p_i, p_{i0})$, outlined above.

Figure 9A:
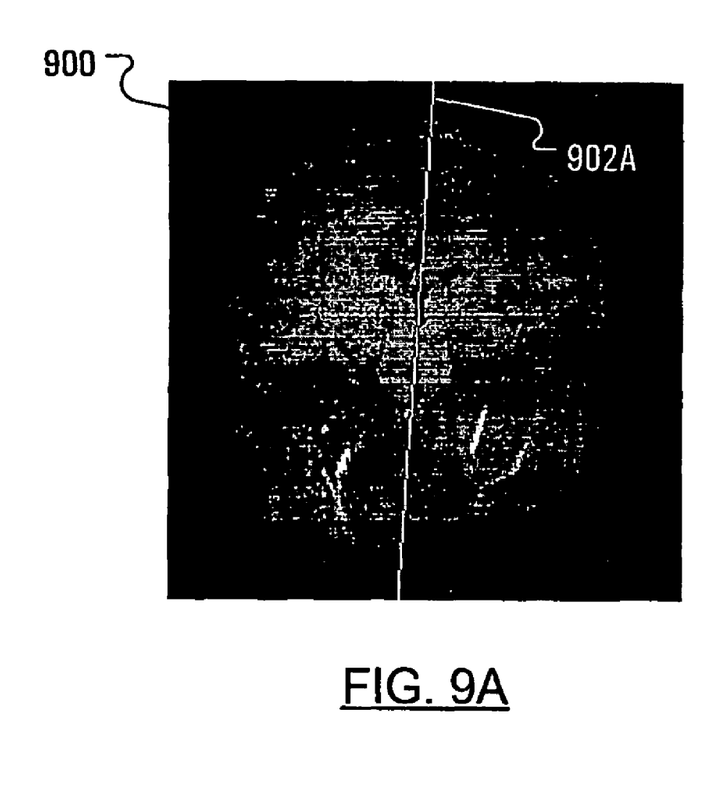
FIG. 9A illustrates a linear representation of a mid-sagittal plane on a coronal slice of brain volume data, where the mid-sagittal plane has been obtained using an energy measure according to an embodiment of the present invention.
Figure 9B:
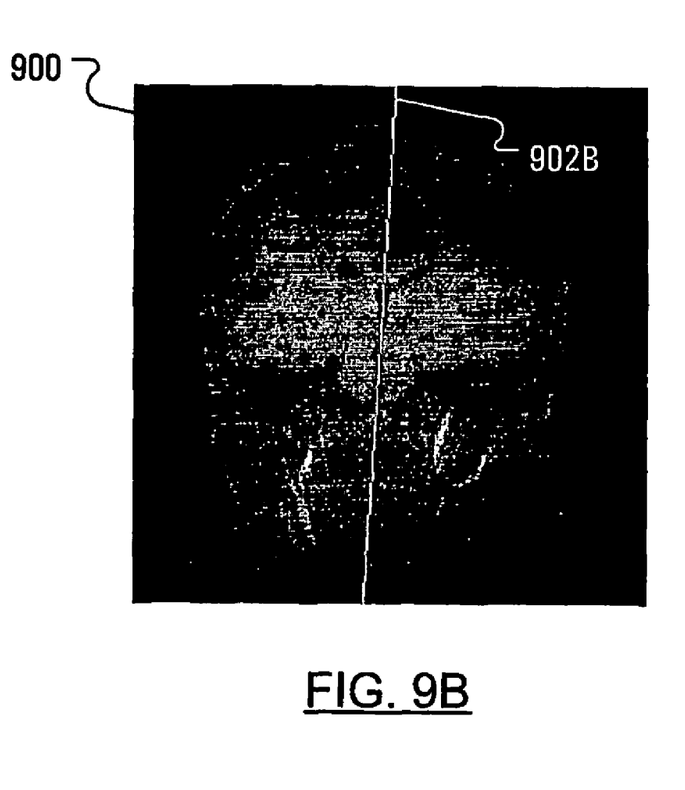
FIG. 9B illustrates a linear representation of a mid-sagittal plane on a coronal slice of brain volume data, where the mid-sagittal plane has been obtained using an entropy (Kullback-Leibler) measure according to an embodiment of the present invention.

FIG. 9A illustrates a linear representation 902A of an optimized (final) mid-sagittal plane on a coronal slice of brain volume data 900, where the mid-sagittal plane has been obtained using the first exemplary energy measure, $I_1$, outlined above. FIG. 9B illustrates a linear representation 902B of an optimized (final) mid-sagittal plane on the coronal slice 900 of FIG. 9A, where the mid-sagittal plane has been obtained using the Kullback-Leibler entropy measure, $I_2(p_i, p_{i0})$, outlined above.

Advantageously, aspects of the methods of determining a location for a mid-sagittal plane in a three-dimensional brain image described above obviate such drawbacks in previously known methods, such as a requirement for a priori information on slice orientation. It may be considered that aspects of the present invention are orientation independent and are not limited to small tilts in the brain volume data.

The foregoing describes the invention including preferred forms thereof. Alterations and modifications as will be obvious to those skilled in the art are intended to be incorporated in the scope hereof as defined by the accompanying claims.

We claim:

1. A processor-aided method of determining a candidate sagittal direction for a brain image, said brain image defined by brain volume data in a three-dimensional space associated with first, second and third directions, said first, second and third directions being orthogonal to each other, said candidate sagittal direction being the closest direction of said first, second and third directions to an actual sagittal direction, comprising:
    defining a first three-dimensional volume of interest of said brain image;
    obtaining brain volume data in said first volume of interest for a first plurality of slices in said first direction;
    defining a second three-dimensional volume of interest of said brain image;
    obtaining brain volume data in said second volume of interest for a second plurality of slices in said second direction;
    defining a third three-dimensional volume of interest of said brain image;
    obtaining brain volume data in said third volume of interest for a third plurality of slices in said third direction;
    determining, with a processor, a value of a measure for each slice of said first, second and third plurality of slices;
    for each of said first, second and third plurality of slices, plotting said value of said measure for said each slice of said plurality of slices, sequentially along a plot axis corresponding to respective first, second and third directions, to produce first, second and third measure plots; and
    determining, with a processor, from said first, second and third measure plots, which of said first, second and third directions is said candidate sagittal direction with a candidate plurality of slices associated therewith.

2. A method as claimed in claim 1 wherein said determining which of said first, second and third directions is said candidate sagittal direction comprises recognizing, from said first, second and third measure plots, a candidate plot, having a single monotonic increasing trend in values of said measure substantially adjacent to a single monotonic decreasing trend in values of said measure, for which said respective plot axis corresponds to said candidate sagittal direction.

3. A method as claimed in claim 1 wherein said determining which of said first, second and third directions is said candidate sagittal direction comprises recognizing, from said first, second and third measure plots, a candidate plot, having the greatest degree of symmetry about an axis orthogonal to said respective plot axis, for which said respective plot axis corresponds to said candidate sagittal direction.

4. The method of claim 1 further comprising selecting a candidate mid-sagittal slice among said candidate plurality of slices, where a value of said measure determined for said candidate mid-sagittal slice is an optimal value of said measure among said values of said measure determined for slices in said candidate plurality of slices.

5. The method of claim 1 wherein said determining said value of said measure for said each slice requires determining a value for a function of intensity data associated with said each slice.

6. The method of claim 1 wherein said determining said value of said measure for said each slice requires determining a value of a measure of energy of said data contained in said each slice.

7. The method of claim 1 wherein said determining said value of said measure for said each slice requires determining a value of a measure of entropy of said data contained in said each slice.

8. The method of claim 4 further comprising outputting coordinates of data contained in said candidate mid-sagittal slice as vertices defining a candidate mid-sagittal plane.

9. The method of claim 8 further comprising determining an optimized mid-sagittal plane by using said vertices defining said candidate mid-sagittal plane in an optimization technique to produce an optimized mid-sagittal plane.

10. The method of claim 9 wherein said optimization technique is the Nelder-Mead optimization technique.

11. A processor-aided method of determining an approximate location for a mid-sagittal slice from a plurality of slices of brain volume data, said method comprising:
    obtaining said brain volume data for said plurality of slices where said plurality of slices is generally oriented parallel to a sagittal plane and said plurality of slices is positioned along an axis that is normal to said sagittal plane;
    determining, with a processor, a value of a measure for each slice of said plurality of slices, wherein each said value of said measure is determined based on said brain volume data contained in said each slice; and
    selecting a candidate mid-sagittal slice among said plurality of slices, based on identifying an optimal value of said measure amongst values of said measure determined for said each slice of said plurality of slices,
    wherein said determining said value of said measure for said each slice requires determining a value of a measure of energy or entropy of said brain volume data contained in said each slice.

12. The method of claim 11 further comprising outputting coordinates of said brain volume data contained in said candidate mid-sagittal slice as vertices defining a candidate mid-sagittal plane.

13. The method of claim 12 further comprising determining an optimized mid-sagittal plane by using said candidate mid-sagittal plane in an optimization technique to produce said optimized mid-sagittal plane.

14. The method of claim 11 wherein said obtaining said brain volume data comprises:
    obtaining brain volume data for a first plurality of slices in a first direction;
    obtaining brain volume data for a second plurality of slices in a second direction; and
    obtaining brain volume data for a third plurality of slices in a third direction;
    where said first, second and third directions are orthogonal to each other.

15. A method as claimed in claim 14 further comprising identifying which of said first, second and third pluralities of slices is generally oriented parallel to said sagittal plane.

16. The method of claim 11 wherein said determining said value of said measure for said each slice requires determining a value for a function of intensity data associated with said each slice.

17. The method of claim 11 wherein said determining said value of said measure for said each slice requires determining a value of a measure of energy of said brain volume data contained in said each slice.

18. The method of claim 17 where said data contained in said each slice includes an intensity value associated with each pixel in a plurality of pixels and said determining said value of said measure for said each slice includes determining a sum of said intensity values associated with said each pixel in said each slice.

19. The method of claim 11 wherein said determining said value of said measure for said each slice requires determining a value of a measure of entropy of said brain volume data contained in said each slice.

20. The method of claim 11 where said brain volume data contained in said each slice includes an intensity value associated with each pixel in a plurality of pixels and said method further comprises determining a first probability distribution for said each slice that includes, for each intensity value in a predetermined range of intensity values, a probability that a pixel randomly selected from among said plurality of pixels in said each slice has said each intensity value.

21. The method of claim 20 wherein said determining said value of said measure for said each slice requires utilizing said first probability distribution to obtain a value of Shannon's entropy for said each slice.

22. The method of claim 20 further comprising:
determining a second probability distribution for said each slice that includes, for said each intensity value in said predetermined range of intensity values, a probability that a pixel randomly selected from among pixels in a reference slice has said each intensity value; and
said determining said value of said measure for said each slice includes determining a Kullback-Leibler distance between said first probability distribution and said second probability distribution for said each slice.

23. The method of claim 11 further comprising normalizing said value of said measure associated with said each slice.

24. The method of claim 11 wherein said brain volume data is magnetic resonance brain volume data.

25. A processor-aided method of determining a candidate sagittal direction for a brain image, said brain image defined by brain volume data in a three-dimensional space associated with first, second and third directions, said first, second and third directions being orthogonal to each other, said candidate sagittal direction being the closest direction of said first, second and third directions to an actual sagittal direction, comprising:
obtaining brain volume data for a first plurality of slices in said first direction;
obtaining brain volume data for a second plurality of slices in said second direction;
obtaining brain volume data in for a third plurality of slices in said third direction;
determining, with a processor, a value of a measure for each slice of said first, second and third plurality of slices;
for each of said first, second and third plurality of slices, plotting said value of said measure for said each slice of said plurality of slices, sequentially along an axis corresponding to respective first, second and third directions to produce first, second and third measure plots;
determining, with a processor, from said first, second and third measure plots, which of said first, second and third directions is said candidate sagittal direction with a candidate plurality of slices associated therewith.

26. A method as claimed in claim 25 wherein said determining which of said first, second and third directions is said candidate sagittal direction comprises recognizing, from said first, second and third measure plots, a candidate plot, having a single monotonic increasing trend in values of said measure substantially adjacent to a single monotonic decreasing trend in measures, for which said respective plot axis corresponds to said candidate sagittal direction.

27. A method as claimed in claim 25 wherein said determining which of said first, second and third directions is said candidate sagittal direction comprises recognizing, from said first, second and third measure plots, a candidate plot, having the greatest degree of symmetry about an axis orthogonal to said respective plot axis, for which said respective plot axis corresponds to said candidate sagittal direction.

28. The method of claim 25 further comprising selecting a candidate mid-sagittal slice among said candidate plurality of slices, where a value of said measure determined for said candidate mid-sagittal slice is an optimal value of said measure among said values of said measure determined for slices in said candidate plurality of slices.

29. A processor-aided method of determining a candidate sagittal direction for a brain image, said brain image defined by brain volume data in a three-dimensional space and being associated with first and second directions which are oriented at an angle to each other, said candidate sagittal direction being the closest direction of said first and second directions to an actual sagittal direction, comprising:
obtaining brain volume data for a first plurality of slices in said first direction;
obtaining brain volume data for a second plurality of slices in said second direction;
determining, with a processor, a value of a measure for each slice of said first and second plurality of slices;
for each of said first and second plurality of slices, plotting said value of said measure for said each slice of said plurality of slices, sequentially along an axis corresponding to respective first and second directions to produce first and second measure plots; and
determining, from said first and second and measure plots, which of said first and second directions is said candidate sagittal direction with a candidate plurality of slices associated therewith.

30. A processor-aided method for processing a three-dimensional brain image, comprising:
for each axis of three orthogonal axes, and for each slice of a plurality of slices in said brain image normal to and along said each axis, calculating a value of a measure of entropy or energy from intensities of pixels in said each slice;
identifying, with a processor, a candidate slice in said brain image whose value of said measure of entropy or energy is a global optimum among values of said measure of entropy or energy of the plurality of said slices normal to and along one of said axes, and wherein on each side of said candidate slice there are slices whose values of said measure of entropy or energy are smaller than said value of said measure of entropy or energy of said candidate slice;
determining, with a processor, the location of a mid-sagittal slice in said brain image that represents the mid-sagittal plane in said brain image, using said candidate slice as an initial candidate for said mid-sagittal slice.

31. The method of claim 30, wherein said value of said measure of entropy or energy is normalized.

32. The method of claim 30, wherein the measure of energy in said each slice is the sum of said intensities of said pixels in said each slice.

33. The method of claim 30, wherein the measure of entropy in said each slice is a measure of uncertainty in the probability that said pixels in said each slice have a specific intensity.

34. The method of claim 30, wherein the measure of entropy is a Kullback-Leibler entropy measure.

* * * * *